Figure 1:
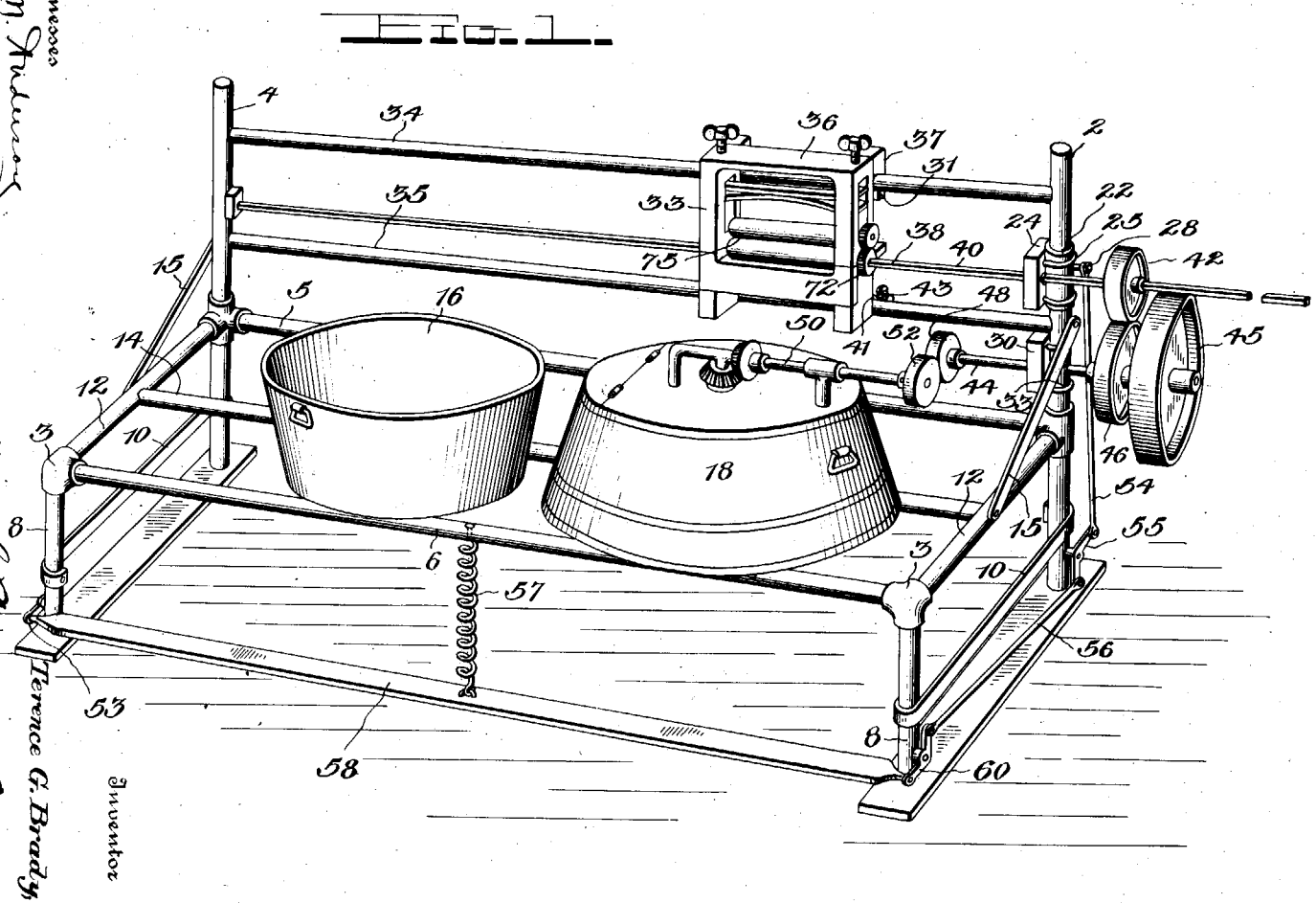

T. G. BRADY.

COMBINED POWER WASHING AND WRINGING MACHINE.

APPLICATION FILED FEB. 16, 1912.

Reissued June 8, 1915.

13,923.

2 SHEETS—SHEET 1.

Witnesses

J. M. Anderson

P. M. Copeland.

Inventor

Terence G. Brady,

By LaPorte & Bean

Attorneys

T. G. BRADY.
COMBINED POWER WASHING AND WRINGING MACHINE.
APPLICATION FILED FEB. 16, 1912.
Reissued June 8, 1915.
13,923.
2 SHEETS—SHEET 2.
FIG. 2.
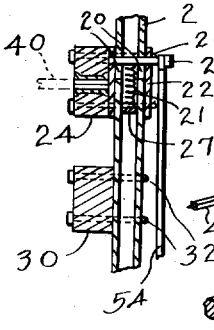
FIG. 3.
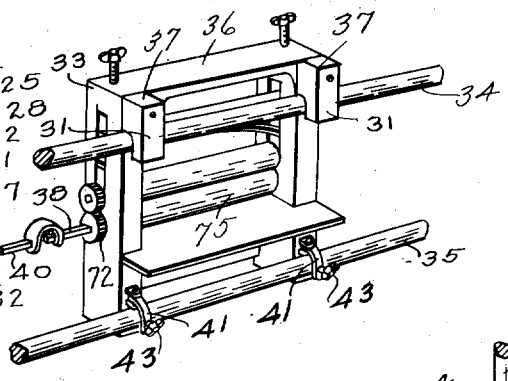
FIG. 4.
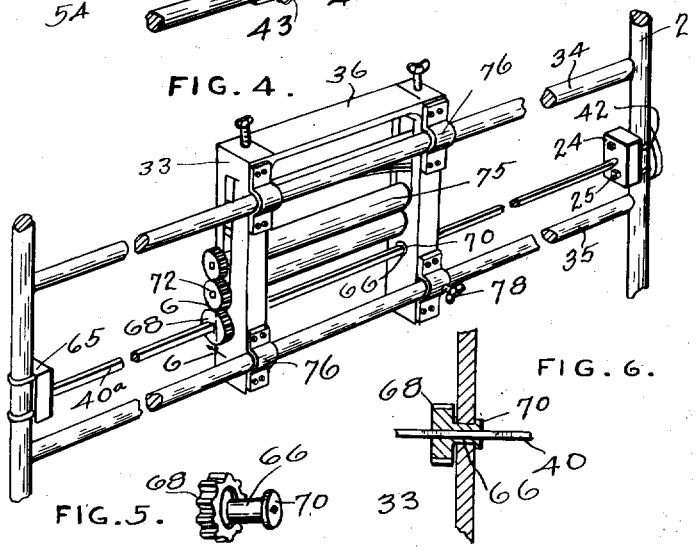
FIG. 6.
FIG. 5.
WITNESSES
J. W. Naylor
Mildred F. Boman
INVENTOR
BY Terence G. Brady
La Porte & Bean
ATTYS.

UNITED STATES PATENT OFFICE.

TERENCE G. BRADY, OF CALMAR, IOWA.

COMBINED POWER WASHING AND WRINGING MACHINE.

13,923. Specification of Reissued Letters Patent. Reissued June 8, 1915.

Original No 1,004,355, dated September 26, 1911, Serial No. 341,706. Application for reissue filed February 16, 1912. Serial No. 678,130.

*To all whom it may concern:*

Be it known that I, TERENCE G. BRADY, citizen of the United States, residing at Calmar, in the county of Winneshiek and State of Iowa, have invented certain new and useful Improvements in Combined Power Washing and Wringing Machines, of which the following is a specification.

The object of my invention is to provide a machine of the character referred to, comprising a support for a washing machine, and one or more tubs or receptacles in which the clothes are rinsed after the washing operation, or into which the clothes may be placed after rinsing, and means for so supporting the clothes wringer that it may be adjusted, preferably manually, to a convenient position relative to said washing machine, tubs or receptacles, whereby, after the washing operation, the clothes may be taken from the washing machine run through the wringer and into a receptacle for receiving the washed clothes.

Another object of the invention is to provide a common support for sustaining the washing machine, tubs or receptacles during the washing and wringing operations; and further, means for utilizing the power used for operating the washing machine, to also operate the wringer.

A more detailed and specific description will be set out in the following specification when read in connection with the drawings accompanying the same and forming a part hereof.

Figure 1 is a perspective view of my device showing one tub and a washing machine in connection with my device. Fig. 2 is a vertical section of one of the standards and part of the attachment to the standard. Fig. 3 is a perspective view of a modified form of the wringer mounted upon its frame. Fig. 4 is a perspective view of a modified form of applying power to operate the wringer and of mounting the wringer. Fig. 5 is a perspective view of a detail, of the modified structure of Fig. 4, showing the means for operating the longitudinally movable wringer from a relatively longitudinally non-movable shaft. Fig. 6 is a detail sectional view of one of the sleeves, on line 6—6 of Fig. 4.

Referring to the drawings, 2 and 4 represent the supporting standards. These standards are connected together by a bar 5. For the purpose of forming a bench or support for the washing machine and the tubs or other washing apparatus, there is provided a pipe or bar 6. The legs 8 are connected to the standards 2 and 4 by a brace 10 and at the top by a cross bar 12. The cross bars are also united together by a central bar 14 and are stayed to the standards by braces 15. A convenient mode of constructing the bench is by uniting gas pipe together by the usual couplings. The union of the bars 5, 6 and 14 secured together as set out and to the standards 2 and 4 with the legs 8 form the supporting bench for the tubs or other washing apparatus 16 and the washing machine 18.

The standard 2 is preferably formed of a tube having therethrough a slot 20 and around the standard a short tube 22. To the tube 22 is secured a block 24 by bolts 25, passing through the block and hooked around the tube 22. The outer ends of the bolts 25 have thereon tightening nuts, whereby the block is rigidly secured upon the movable tube 22. Through the tube 22 and the slot 20 in the standard 2 is a pin 28, which is rigidly fixed in the block 24. Below the block 24 is attached to the standard 2 another block 30 by bolts 32. In the standard 2 is transversely fixed a plate 27 upon which is seated a coil spring 21. The spring engages with the pin 28 and keeps the pin normally in the upper part of the slot 20 for purposes presently to appear.

In the standards 2 and 4 are secured two bars 34 and 35. Upon these bars is adjustably mounted a wringer 36 in such a manner that the wringer may be moved to any position along the bars.

The mode of adjustably attaching the wringer to the two bars is preferably by fastening a block having a hook portion 31 to each of the side bars 33 of the wringer 36. The block consists of the body 37 and a hook portion 31. The hooks engage the upper bar 34 and slide thereon. The lower end of the wringer is secured to the lower bar 35 by clamps 41 secured to the side bars 33 of the wringer and provided with set screws 43.

For the purpose of operating the wringer, there is coupled to the wringer shaft 38, a shaft 40, which extends through a rotatable collar secured in the block 24 and upon it is mounted pulley 42. This shaft 40 is preferably made square so as to slide through the square opening in the pulley 42 and still furnish the means whereby the pulley may rotate said shaft 40 when actuated.

In Fig. 4 is shown a modified form for applying the power to operate the wringer. In this the wringer 36 is mounted on the two bars 34 and 35, the shaft 40ª however is not movable endwise but is journaled in the block 24 at one end and at the other end in a block 65 attached to the standard 4. This shaft is square except where it is journaled in the blocks 24 and 65 and passes through the side bars 33 of the wringer. Upon one end of the shaft is rigidly mounted the pulley 42. Within the wringer side bars 33 are secured sleeves 66 shown in Figs. 5 and 6 which are round on the outside and square or the shape of the shaft 40ª on the inside, and are provided at one end with a gear wheel 68 and a rib 70 at the other end so as to prevent the movement of the sleeves endwise. The gear 68 meshes in with the gears 72 on the wringer, and when the shaft 40 is rotated it will operate the rollers 75 of the wringer. When this mode of operating the wringer is used, then the wringer may be mounted on the bars 34 and 35 by straps 76 secured to the wringer frame on opposite sides and over the said bars. There may also be a set screw 78 through one of the straps to prevent sidewise movement of the wringer along on the bars 34 and 35. The operation of the wringer is the same whether the power is applied by a shaft that has a longitudinal movement or by a shaft journaled as hereinbefore set out.

Journaled in the block 30 is a shaft 44 upon which is mounted at its outer end a drive pulley 45, to which is secured a smaller pulley 46. To the ordinary washing machine shaft 50 is secured a pulley 52 which is mounted in frictional contact with a pulley 48 on the shaft 44. To the pin 28 is secured a rod 54 which extends down and is attached to one of the arms of a lever 55. To the other arm of the lever is secured a rod 56 which rod is attached to the arm of another lever 60 secured to a leg 8. Upon the other arm of the lever 60 is secured a treadle 58 which extends the length of the bench and is attached at its other end to a lever 53 upon the left leg 8. To the treadle 58 is attached a spring 57 and said spring is also attached to the pipe or bar 6. The function of the treadle 58 is to provide a means for the operator to control the operation of the wringer mechanism and the function of the spring 57 is to sustain the treadle 58 in position to be engaged by the operator. By means of the treadle 58 the operator can put the wringer into action at will and when the treadle is released the spring 21 assisted by the spring 57 move the treadle 58 and associated parts so as to place the wringer in inoperative relation with the power.

The manner of operating my device is substantially as follows;—The washing machine is started by applying power to the pulley 45 which rotates the pulley 48 upon the shaft 44 and this rotates the pulley 52 by its frictional contact therewith and this in turn rotates the driving shaft of the washing machine.

When the clothes are sufficiently washed in the machine, then the wringer 36 is adjusted over the tub 16 by operating the set screw 43 and releasing the clamp 41 then sliding the wringer along on the two bars 34 and 35 with the hooks 31 in engagement with the bar 34. As the wringer is moved along the bar 34 it draws with it the shaft 40 coupled to the wringer shaft 38, partly through the block 24 and pulley 42. If the modified form of mounting the wringer be used, then the set screw 78 is operated and releases the wringer and allows the wringer to be moved anywhere along on the bars 34 and 35. The operator then places his foot on the treadle 58 which turns the lever 60 and pulls the rod 56 to the left and this operates the lever 55 and draws down the rod 54 and with it the pin 28 in the slot 20 in the standard 2 and with it the block 24, tube 22 and also the pulley 42 into frictional engagement with the pulley 46 which rotates the pulley 42 and the shaft 40 and operates the wringer shaft.

When the operator has finished the use of the wringer he raises his foot off from the treadle 58 and the spring 21 comes into action and raises the block 24, the tube 22 and with it the pulley 42 out of frictional contact with the pulley 46. The spring 21 keeps the pulley 42 and 46 out of contact when the wringer is not in use.

When it is desired to use the wringer over some other tub then the wringer is moved along on the bars 34 and 35 as before stated over that tub. If there are a large number then the bench will be made long enough to accommodate as many as desired.

It will be seen by this mode of construction and arrangement that there will be furnished a substantial bench on which to sustain the washing machine, tubs and other apparatus and the wringer can be conveniently adjusted for any position above the tubs or washing machine and in convenient position and always ready for immediate use, and further it will be seen that the power that is used to operate the washing machine can immediately be brought into proper relation to operate the wringer.

Having now described my invention what I claim is;—

1. In a device of the character described, the combination with a support, a machine longitudinally adjustable upon said support and means for operating the machine by power in any adjusted position thereof, said means including a shaft connected to said machine and a pulley, said shaft and said machine having a sliding relation to each other, said pulley being relatively fixed upon the support, and a second pulley adapted to be thrown into and out of engagement with said first named pulley.

2. The combination with a support, a machine longitudinally movable thereon, a shaft adapted to engage said machine in any of its longitudinally adjusted positions, a pulley on said shaft, relatively longitudinally non-movable, a drive pulley and means for throwing the pulley on the shaft and the drive pulley into or out of engagement as desired.

3. An apparatus of the character described, including in combination, a supporting means, a machine mounted thereon, a second machine slidable at will with relation to said machine, means for actuating said second machine in any of its adjusted positions, means for operating the first named machine, power driven means for operating the actuating means of the second named machine and the first named machine, means whereby the actuating means of the second named machine is normally held out of connection with said power driven means, and means to enable said second machine actuating means to be operatively connected to said power driven means.

4. In combination with a support, a machine mounted thereon, a second machine slidably mounted on said support, means for actuating said second machine in any of its adjusted positions, means for operating the first named machine, power driven means for operating actuating means of both of said machines, vertically slidable spring-pressed means to normally hold the actuating means of the second named machine out of contact with said power driven means, and means for operating said spring-pressed means to bring said actuating means into contact with said power driven means.

5. An apparatus of the class described, including in combination, a supporting means, a washing mechanism and a wringer mechanism mounted on said supporting means, one of said mechanisms being movable relatively to the other, mechanism to operate said washing mechanism and also adapted to operate said wringer mechanism in any position.

6. An apparatus of the character described, including in combination, a support adapted to sustain a washing machine and one or more receptacles, a wringer mechanism mounted on said support and movable opposite the position for said washing machine or said receptacles, and means to drive the wringer mechanisms in any of said positions.

7. An apparatus of the character described, including in combination, a common support for a washing machine, rinsing receptacles and a wringer; a washing machine mounted on said support and operating means therefor, a drive shaft, means thereon for placing said drive shaft in operative connection with power, and driving connection between said drive shaft and said washing machine operating means, a wringer mounted on said support and adapted to be moved so as to be brought opposite to either said washing machine or other receptacles on said support, driving means for said wringer, said driving means being normally in inoperative relation with said drive shaft, and means for establishing an operative connection between said wringer driving means and said drive shaft, whereby the wringer may be operated at various positions on said support.

8. An apparatus of the character described, including in combination, a supporting means, a washing machine mounted on said supporting means, a driving mechanism, and driving connections between said washing machine and said driving mechanism, a wringer mechanism movable relatively to said washing machine, wringer actuating means being normally in inoperative relation with said driving mechanism, and means for establishing an operative relation between said wringer actuating means and said driving mechanism.

9. An apparatus of the character described, including in combination, a supporting means, adapted to sustain a washing machine, a wringer mechanism mounted thereon and adapted to be moved to different positions relatively to said washing machine, means for locking or fixing said wringer mechanism in its different positions, a power driven element, driving connections between said power driven element and said wringer mechanism, and means for controlling said driving connections to actuate said wringer mechanism as desired, in its different positions.

10. An apparatus of the character described, including in combination, a washing machine and a wringer mechanism associated therewith, said wringer mechanism being so mounted that it may be moved to various positions with respect to said washing machine, whereby to progressively operate upon the same work during different stages of its treatment, a driving means, driving connections for operating said washing machine from said driving means, driving connections between said driving means and said wringer mechanism, including a part normally out of operative relation with the said driving means, but adapted to be moved into operative relation therewith, and means for controlling said driving connections whereby said washing machine and said wringer mechanism may be operated one at a time or simultaneously, regardless of the position of said wringer mechanism.

11. A washing machine having in combination a support for a plurality of receptacles, a driving means, a train of mechanism extending from said driving means to a part of the machine, a second train of mechanism extending from said driving means to another part of the machine, a wringer connected to said second train of mechanism, and means admitting of the adjustment of the wringer at will to different positions relative to said receptacles while maintaining the driving relation with said driving means.

In testimony whereof I have signed my name to this specification in the presence of two subscribing witnesses.

TERENCE G. BRADY.

Witnesses:

M. M. CADY,

CHAS. N. LA PORTE.